(12) United States Patent
Kishigami

(10) Patent No.: US 11,813,659 B2
(45) Date of Patent: Nov. 14, 2023

(54) PRESS FORMING METHOD AND PRESS FORMING APPARATUS FOR AUTOMOTIVE OUTER PANEL

(71) Applicant: JFE STEEL CORPORATION, Tokyo (JP)

(72) Inventor: Yasuhiro Kishigami, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/642,778

(22) PCT Filed: Apr. 8, 2020

(86) PCT No.: PCT/JP2020/015855
§ 371 (c)(1),
(2) Date: Mar. 14, 2022

(87) PCT Pub. No.: WO2021/065054
PCT Pub. Date: Apr. 8, 2021

(65) Prior Publication Data
US 2022/0388053 A1    Dec. 8, 2022

(30) Foreign Application Priority Data
Sep. 30, 2019   (JP) ................................. 2019-178269

(51) Int. Cl.
*B21D 22/26*   (2006.01)
*B21D 24/04*   (2006.01)
(Continued)

(52) U.S. Cl.
CPC ............. *B21D 53/88* (2013.01); *B21D 22/22* (2013.01); *B21D 22/26* (2013.01); *B21D 24/04* (2013.01); *B60J 5/0415* (2013.01)

(58) Field of Classification Search
CPC ........ B21D 53/88; B21D 22/22; B21D 22/26; B21D 24/04; B21D 22/10; B21D 24/08; B60J 5/0415; B60J 5/00
See application file for complete search history.

(56) References Cited

U.S. PATENT DOCUMENTS 2,783,727 A * 3/1957 Hoffmann .............. B21D 22/12
                                                    72/57
10,179,360 B2 * 1/2019 Aso ........................ B21D 53/88
(Continued)

FOREIGN PATENT DOCUMENTS

DE   10 2014 221 878 A1   4/2016
JP       S63-058652 B2   11/1988
(Continued)

OTHER PUBLICATIONS

Rudi ter Harr, Friction in Sheet Metal Forming, Printed by drukkerij Salland De Lange, Deventer (Year: 1967).*
(Continued)

*Primary Examiner* — Lawrence Averick
(74) *Attorney, Agent, or Firm* — Oliff PLC

(57) ABSTRACT

A press forming method for an automotive outer panel according to the present invention is a method for press forming a metal sheet 51 into an automotive outer panel 61 having a character line 63 and panel surface portions 65a and 65b by using a punch 3, a die 5, and a blank holder 7. The press forming method includes: a step of providing an elastic body 9 protruding toward the punch 3 side on a die-side forming surface portion 5b forming the panel surface portion 65a, and bringing the elastic body 9 into contact with the metal sheet 51 prior to the die 5; and a step of press forming while crushing the elastic body 9 and pressing the metal sheet 51, and the elastic body 9 is caused to protrude from the die-side forming surface portion 5b so that a frictional force of the crushed elastic body 9 and the metal (Continued)

sheet 51 is equal to or greater than an absolute value of a difference between tensions acting on both sides of a portion 53 corresponding to the character line 63.

12 Claims, 9 Drawing Sheets

(51) Int. Cl.
    *B60J 5/04*               (2006.01)
    *B21D 53/88*           (2006.01)
    *B21D 22/22*           (2006.01)

(56) References Cited

U.S. PATENT DOCUMENTS

| | | | |
|---|---|---|---|
| 10,688,551 B2* | 6/2020 | Aso | B21D 22/26 |
| 11,059,085 B2* | 7/2021 | Miyagi | B21D 53/88 |
| 2009/0038365 A1 | 2/2009 | Yoshida et al. | |
| 2010/0186475 A1 | 7/2010 | Hirotani | |
| 2013/0025343 A1 | 1/2013 | Golovashchenko | |
| 2015/0224563 A1* | 8/2015 | Aso | B62D 25/08 |
| | | | 428/595 |
| 2017/0333972 A1* | 11/2017 | Nishimura | B21D 5/01 |
| 2018/0264534 A1* | 9/2018 | Aso | B21D 47/01 |
| 2019/0111463 A1 | 4/2019 | Natori et al. | |
| 2020/0038931 A1* | 2/2020 | Miyagi | B21D 5/01 |
| 2021/0220897 A1 | 7/2021 | Sawa et al. | |

FOREIGN PATENT DOCUMENTS

| | | |
|---|---|---|
| JP | 2007-268608 A | 10/2007 |
| JP | 2015-199102 A | 11/2015 |
| JP | 5876786 B2 | 3/2016 |
| JP | 5959702 B1 | 8/2016 |
| JP | 2017-200708 A | 11/2017 |
| JP | 2018-103249 A | 7/2018 |
| JP | 2018-158351 A | 10/2018 |
| JP | 2018-183786 A | 11/2018 |
| WO | 2019/073614 A1 | 4/2019 |

OTHER PUBLICATIONS

Oct. 28, 2022 Office Action issued in European Patent Application No. 20871650.6.
Jun. 9, 2020 International Search Report issued in International Patent Application No. PCT/JP2020/015855.

* cited by examiner

PRESS FORMING METHOD AND PRESS FORMING APPARATUS FOR AUTOMOTIVE OUTER PANEL

FIELD

The present invention relates to a press forming method and a press forming apparatus for an automotive outer panel, in which an automotive outer panel in which a character line is formed is press formed. In the present invention, a metal sheet refers to a hot-rolled sheet, a cold-rolled sheet, or a surface treated steel sheet with surface treatment (electro galvanization, hot-dip galvanization, organic coating treatment, and the like) applied to a steel sheet, as well as a sheet made of various metals such as stainless steel, aluminum, and magnesium.

BACKGROUND

The automotive outer panel used for a door outer, a front fender, a rear fender, and the like of automobiles is often marked with a character line on its outer surface from the viewpoint of improving designability and tension rigidity of the automobiles. The character line is usually given by pressing a metal sheet (blank) against a ridgeline provided on a punch of a press mold, and sandwiching it with valley lines of a die. Especially in recent years, in order to further improve the designability of the automobiles, it has been required to give a sharp (that is, curvature of the ridgeline is large (curvature radius is small)) character line.

By the way, in this kind of press forming, when tension generated in the metal sheet during forming is imbalanced, the metal sheet may slide in a direction of large tension, the ridgeline of the punch may come into contact with a portion other than a portion to which the character line should be given, and a linear pattern may be generated Such a linear pattern remains even after coating, to be an appearance defect called a skid line of the outer panel. The skid line is an obstacle to improving the designability of the automobiles because the skid line is especially noticeable when the press forming is performed to give a sharp character line using a punch in which a tip of the ridgeline is formed by an arc having a small section radius.

Several techniques have been proposed so far for restraining generation of such a linear pattern and giving a character line.

For example, Patent Literature 1 discloses a press forming method for providing a die and a blank holder with a forming auxiliary cross-sectional shape of a design recess to sandwich a peripheral edge of a blank, so that a central portion of the blank is bent and deformed in advance along a forming surface of the punch, and then forming a design surface by forming with the punch. Patent Literature 2 discloses a method for preventing the skid line by using a suction device, in which a suction port is formed on a press surface provided with a linear protrusion for forming the character line to perform suction from the suction port via a gas flow path, and adsorbing the metal sheet to the press surface and press forming it, thereby restraining movement of the metal sheet Patent literature 3 discloses a technique for performing primary press forming on a material by a punch angle and a cushion pad, and then performing deep drawing and bulging while lowering the punch, thereby preventing the skid line generated in a portion of a metal material with which the punch angle is in contact.

Patent Literature 4 discloses a technique for removing the skid line to obtain a high-quality press formed product by a first press forming step of forming a pre-forming shape and a second press forming step of further forming the pre-forming shape, when the press formed product having a ridgeline portion is produced Patent Literature 5 discloses a technique for forming the character line on the blank by a die pad made of an elastic body and a tip of the punch, and forming a portion other than the character line by the die and the punch while the formed character line is constrained by the die pad and the punch. Patent Literature 6 discloses a technique for restraining sliding of the blank by pressing a plate-shaped blank against a lower tool of press forming having a convex R portion for forming the character line, and bringing a pressing pad into contact with the blank in the vicinity of the convex R portion after the blank gets attached to the convex R portion.

CITATION LIST

Patent Literature

Patent Literature 1: Japanese Patent No. 5876786
Patent Literature 2: Japanese Patent Application Laid-open No. 2015-199102
Patent Literature 3: Japanese Patent No. S63-58652
Patent Literature 4: Japanese Patent No. 5959702
Patent Literature 5: Japanese Patent Application Laid-open No. 2018-158351
Patent Literature 6: Japanese Patent Application Laid-open No. 2018-183736

SUMMARY

Technical Problem

However, the techniques disclosed in Patent Literatures 1 to 6 have the following problems.

In the technique disclosed in Patent Literature 1, deformation by the die and the blank holder provided with the forming auxiliary cross-sectional shape is not constrained by the punch, and only both ends of the blank corresponding to the design recess can be constrained, and thus this bending deformation is limited to a linear shape. In the technique disclosed in Patent Literature 2, a suction device that is not used in ordinary press forming is required, and there is a concern that a shape of the suction port is transferred to a surface of the formed product. In the technique disclosed in Patent Literature 3, since a final product shape is partially formed during forming, there is a concern that surface distortion occurs between a forming completed portion and a forming uncompleted portion.

In the technique disclosed in Patent Literature 4, since the tool of press forming for forming the pre-forming shape and the tool of press forming for forming a target shape are different, the number of steps such as replacement of the tool of press forming has increased. In the technique disclosed in Patent Literature 5, since the character line is formed by the elastic body, there is a concern that, when a plurality of character lines are close to each other, the character line cannot be formed according to the target shape. In the technique disclosed in Patent Literature 6, when shaping of the surface is complicated, there is a concern that it is not possible to set an appropriate timing for the pressing pad to come into contact with the blank, and the pressing pad causes a fold on the blank.

The present invention has been made to solve the above-mentioned problems, and an object of the present invention is to provide the press forming method and the press forming apparatus for the automotive outer panel, in which the skid line is prevented without increasing man-hours for press forming and a target character line is formed.

Solution to Problem

To solve the problem and achieve the object, a press forming method for an automotive outer panel, according to the present invention press forms a metal sheet into the automotive outer panel having a character line and panel surface portions continuous on both sides of the character line using a punch, a die facing the punch and a blank holder facing an end of the die, wherein the die includes an elastic body that protrudes toward the punch than a die-side forming surface portion so that the elastic body is able to contact and press a position away from a portion corresponding to the character line in the metal sheet, along n the portion corresponding to the character line, and is supported to be contractable until a contact surface portion in contact with the metal sheet is flush with the die-side forming surface portion. The press forming method includes: an elastic body contact step of moving the die relative to the punch side while both ends of the metal sheet are sandwiched between the die and the blank holder, to bring the contact surface portion of the elastic body into contact with the metal sheet before a portion of the metal sheet in contact with the punch is plastically deformed; and a press forming step of further moving the die relative to the punch side up to a bottom dead center while pressing the metal sheet by the contact surface portion of the elastic body to contract the elastic body, wherein an amount of protrusion of the elastic body from the die-side forming surface portion is set so that a frictional force given by a product of a load of the elastic body pressing the metal sheet in the press forming step and a friction coefficient of the elastic body and the metal sheet, is equal to or greater than an absolute value of a difference between tensions acting on both sides sandwiching the portion corresponding to the character line.

Moreover, in the press forming method for the automotive outer panel according to the present invention, the elastic body is supported on the die side via a movable device configured to press the elastic body toward the punch and pressing the metal sheet.

Moreover, in the press forming method for the automotive outer panel according to the present invention, the elastic body presses a portion on a side having low tension among portions on both sides sandwiching the portion corresponding to the character line.

Moreover, in the press forming method for the automotive outer panel according to the present invention, the elastic body presses a portion on a side having high tension among portions on both sides sandwiching the portion corresponding to the character line.

Moreover, a press forming apparatus for an automotive outer panel, according to the present invention includes: a punch; a die facing the punch; and a blank holder facing an end of the die, wherein the apparatus press forms a metal sheet into the automotive outer panel having a character line and panel surface portions continuous on both sides of the character line, wherein the die includes die-side forming surface portions respectively forming the panel surface portions on both sides of the character line, one of the die-side forming surface portions includes an elastic body that protrudes toward the punch than the die-side forming surface portion so that the elastic body is able to contact and press a position away from a portion corresponding to the character line in the metal sheet, along the portion corresponding to the character line, and is supported to be contractable until a contact surface portion in contact with the metal sheet is flush with the die-side forming surface portion, and an amount of protrusion of the elastic body from the die-side forming surface portion is set so that a frictional force given by a product of a load of the elastic body pressing the metal sheet in the press forming process and a friction coefficient of the elastic body and the metal sheet, is equal to or greater than an absolute value of a difference between tensions acting on both sides sandwiching the portion corresponding to the character line.

Moreover, in the press forming apparatus for the automotive outer panel according to the present invention, the elastic body is supported on the die side via a movable device configured to press the elastic body toward the punch and press the metal sheet.

Moreover, in the press forming apparatus for the automotive outer panel according to the present invention, the elastic body is provided on the die so as to press a portion on a side having low tension among portions on both sides sandwiching the portion corresponding to the character line.

Moreover, in the press forming apparatus for the automotive outer panel according to the present invention, the elastic body is provided on the die so as to press a portion on a side having high tension among portions on both sides sandwiching the portion corresponding to the character line.

Advantageous Effects of Invention

According to the present invention, by projecting the elastic body from the die-side forming surface portion, and press forming the metal sheet while pressing the elastic body against the metal sheet, a frictional force between the elastic body that protrudes from the die-side forming surface portion and is crushed and the metal sheet can be larger than a difference between tensions acting on both sides sandwiching the portion corresponding to the character line in the metal sheet, and it is possible to press form the automotive outer panel in which the skid line generated by the difference between the tensions is prevented and the character line is formed.

DESCRIPTION OF EMBODIMENTS

Prior to explaining a press forming method and a press forming apparatus for an automotive outer panel according to first and second embodiments of the present invention, a skid line generated in press forming of the automotive outer panel having a character line will be described.

<Reason why Skid Line is Generated>

Figure 8:
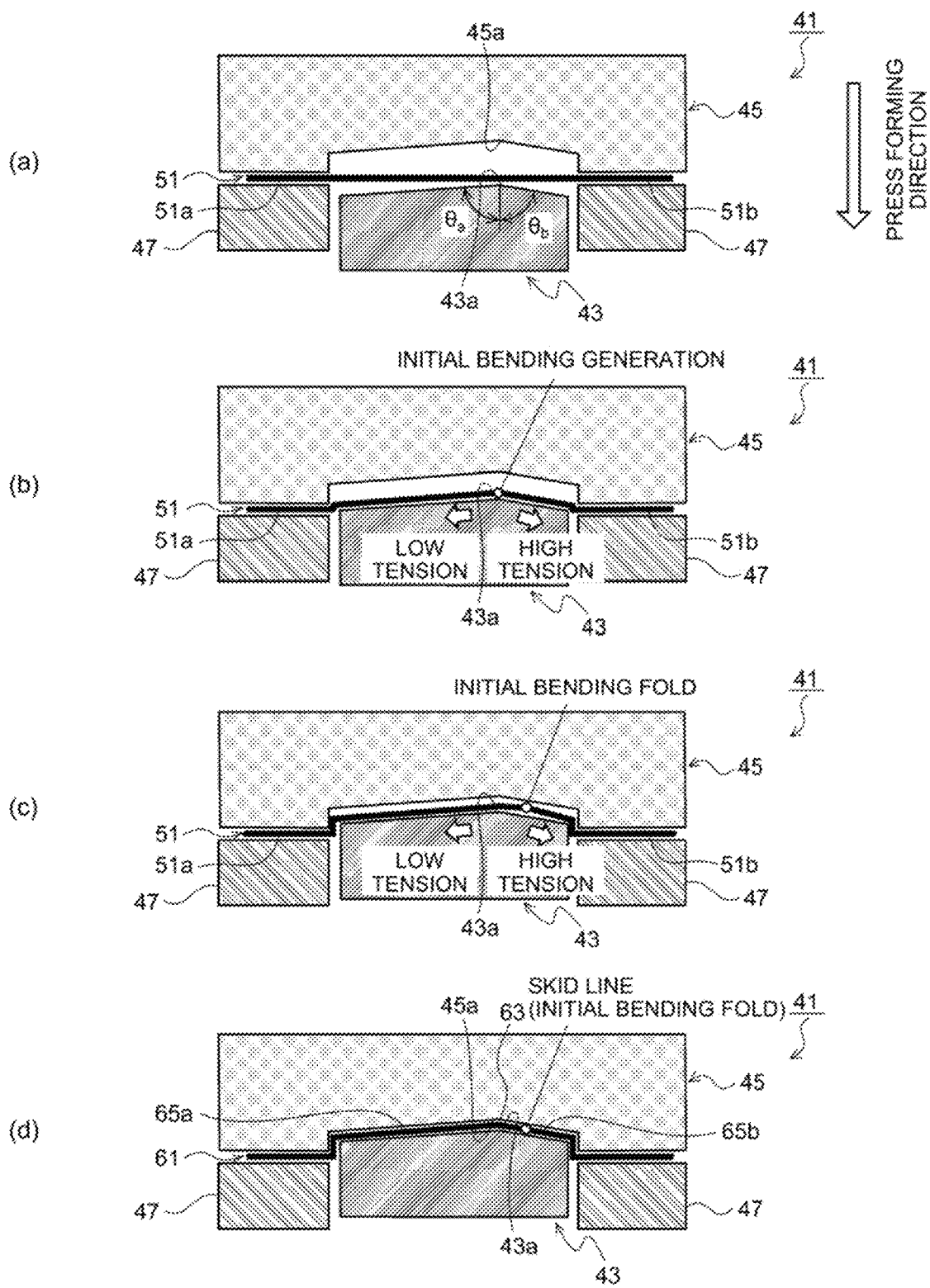
FIG. 8 is a diagram illustrating a conventional press forming apparatus and press forming method f r the automotive outer panel, and a skid line generated in the press forming process.

For example, as illustrated in FIG. 8, an automotive outer panel 61, which is an object of the present invention, is deep drawn as follows using a press forming apparatus 41 including a punch 43 having a ridgeline 43a extending in a front and back direction of a paper surface, a die 45 having a valley line 45a extending in the front and back direction of the paper surface, and blank holders 47 facing both ends of the die 45.

First, as illustrated in (a) of FIG. 8, an end 51a and an end 51b of a metal sheet 51 are respectively sandwiched between the die 45 and the blank holders 47. Then, while the ends of the metal sheet are sandwiched, as illustrated in (b) to (d) of FIG. 8, the die 45 is moved relative to the punch 43 side up to a bottom dead center, to press form the automotive outer panel 61 forming a character line 63 by the ridgeline 43a of the punch 43 and the valley line 45a of the die 45.

When the die 45 is moved relative to the punch 43 side in this press forming process, the ridgeline 43a of the punch 43 first comes into contact with the metal sheet 51, and initial bending occurs in the metal sheet 51 ((b) of FIG. 8). Then, in a process of deep drawing progress by the die 45 and the punch 43, tensions are generated in the metal sheet 51 in respective directions from an initial bending fold toward the ends 51a and 51b sandwiched by the blank holders 47 ((b) and (c) of FIG. 8).

Such tensions generated in the metal sheet 51 differ with each other with the initial bending fold as a boundary due to a difference between respective distances from the initial bending fold to the end 51a and the end 51b, a difference between angles of a panel surface portion 65a and a panel surface portion 65b ((d) of FIG. 8) with respect to a press forming direction, and the like.

For example, as in the press forming of the automotive outer panel 61 illustrated in FIG. 8, when forming depths of the end 51a and the end 51b are almost the same, and an angle θb on the end 51b side from the initial bending fold with respect to the press forming direction is smaller than an angle θa on the end 51a side, the tension generated on the end 51b side is larger than the tension generated on the end 51a side ((b) of FIG. 8).

When a difference in tension is generated in the metal sheet 51 as described above, the metal sheet 51 slides from a side having low tension to a side having high tension, and the initial bending fold slides to the end 51b side having high tension ((c) of FIG. 8). Then, the initial bending fold is crushed by the die 45 and the punch 43 at the bottom dead center, and a linear pattern, that is, the skid line is generated ((d) of FIG. 8).

In this way, in the automotive outer panel 61 in which the character line 63 is formed, tension imbalance generated in the metal sheet 51 in a deep drawing process is a factor that causes the skid line. Then, examples of a factor that causes the tension imbalance include the difference between respective distances and angles from a portion, with which the ridgeline 43a of the punch 43 comes into contact, to the end 51a and the end 51b, and a difference between the forming depths at both ends of the metal sheet 51 due to these factors.

When the forming depths at both ends 51a and 51b of the metal sheet 51 are different from each other, the tension generated on the end 51b side having a larger forming depth in the deep drawing process is larger, and the skid line is generated by the difference in tension with the end having a smaller forming depth.

Therefore, in employing the press forming method of the present invention, as illustrated in FIG. 8, it is preferred that the metal sheet 51 is previously placed in a direction (horizontal direction on the paper surface) perpendicular to the press forming direction, to be press formed, and tensions respectively acting on regions (on the end 51a side and the end 51b side) divided by the portion with which the ridgeline 43a of the punch 43 comes into contact are actually measured, or the tensions are calculated by press forming analysis by a finite element method (FEM) or the like, so that the magnitude and value of the tensions generated in the metal sheet 51 in the press forming process are obtained in advance.

Next, the press forming method and the press forming apparatus for automotive outer panel parts according to the first embodiment and the second embodiment of the present invention will be described. Note that in the following description, components having the same function are denoted by the same reference numerals as those described above, and duplicate explanations will be omitted.

First Embodiment

<Press Forming Apparatus>

Figure 1:
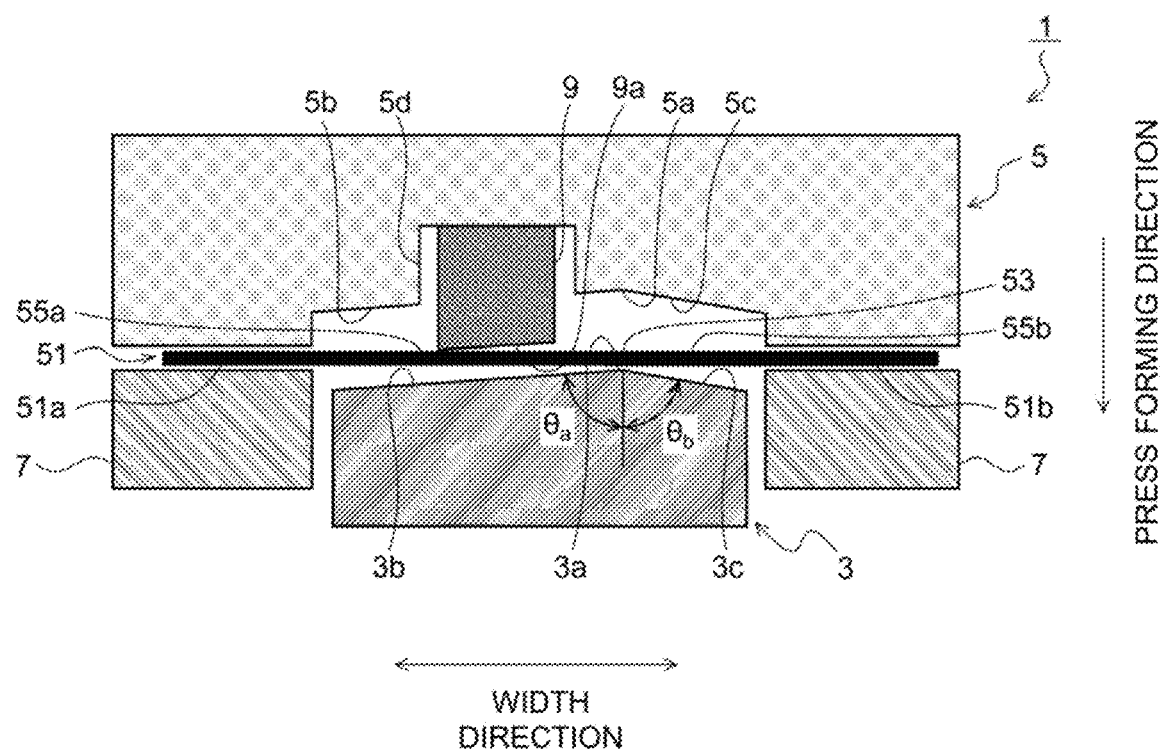
FIG. 1 is a diagram illustrating a press forming apparatus for an automotive outer panel according to a first embodiment of the present invention.
Figure 2:
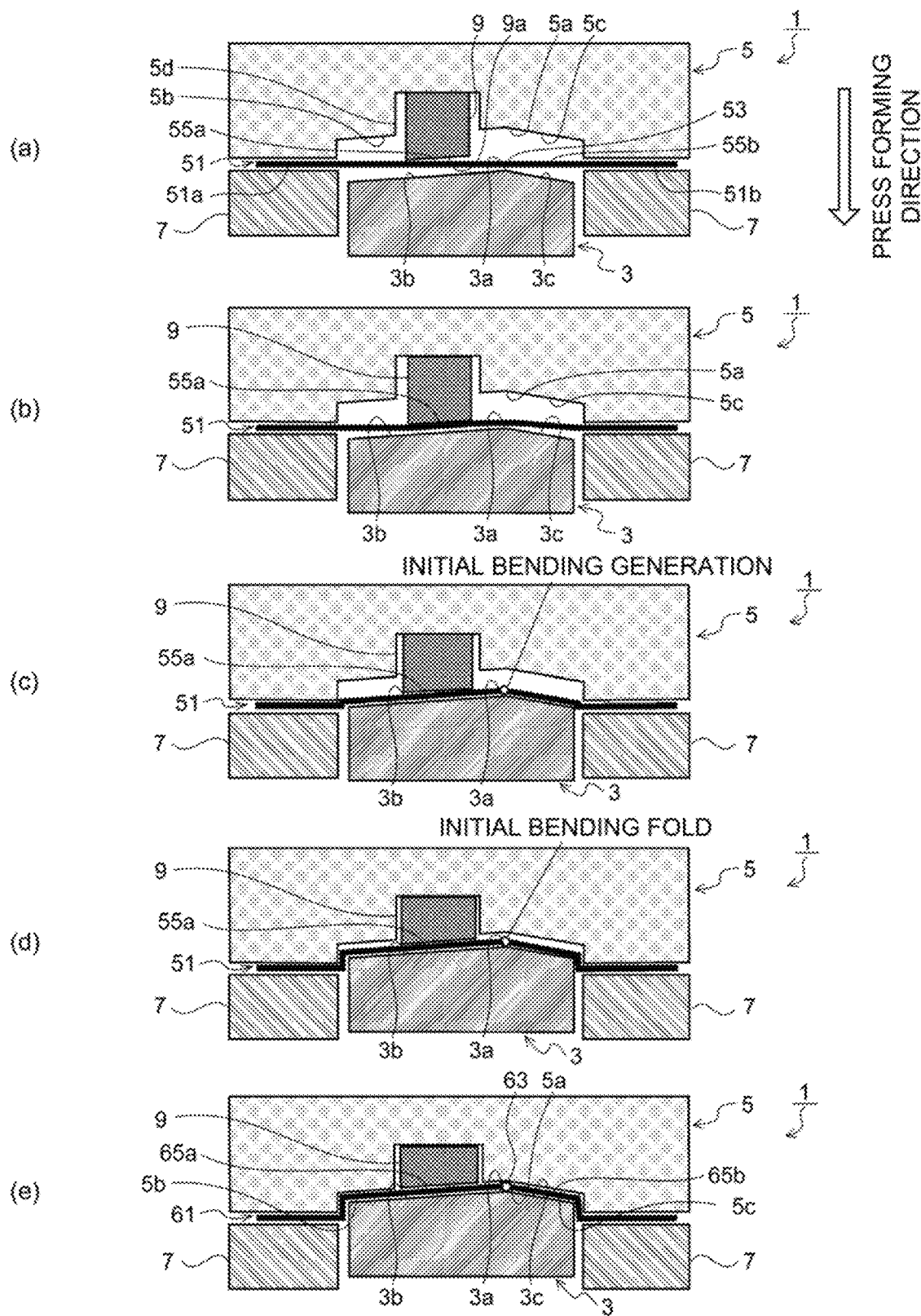
FIG. 2 is a diagram illustrating a press for method for the automotive outer panel according to the first embodiment of the present invention.

A press forming apparatus 1 for the automotive outer panel parts according to the first embodiment (hereinafter, simply referred to as the "press forming apparatus 1") is an apparatus for press forming the metal sheet 51 into the automotive outer panel 61 having the character line 63 and the panel surface portions 65a and 65b continuous on both sides of the character line 63, and as illustrated in FIGS. 1 and 2, includes a punch 3, a die 5, blank holders 7, and an elastic body 9.

As illustrated in FIG. 8 described above, it is assumed that the automotive outer panel 61 ((e) of FIG. 2) to be formed in the first embodiment has the tension generated on the end 51b side larger than the tension generated on the end 51a side from the initial bending fold in the press forming process (FIG. 2).

As illustrated in FIGS. 1 and 2, the punch 3 has a ridgeline 3a and punch-side forming surface portions 3b and 3c located on both sides sandwiching the ridgeline 3a. The ridgeline 3a forms the character line 63 ((e) of FIG. 2). The punch-side forming surface portions 3b and 3c respectively form the panel surface portions 65a and 65b ((e) of FIG. 2).

The die 5 has a valley line 5a, die-side forming surface portions 5b and 5c continuous on both sides sandwiching the valley line 5a, and a groove 5d formed in a concave shape in the die-side forming surface portion 5b. The valley line 5a cooperates with the ridgeline 3a or the punch 3 to form the character line 63 ((e) of FIG. 2). The die-side forming surface portions 5b and 5c respectively cooperate with the punch-side forming surface portions 3b and 3c to form the panel surface portions 65a and 65b ((e) of FIG. 2).

Here, the punch-side forming surface portion 3b and the die-side forming surface portion 5b form a portion 55a on a side having low tension acting on the metal sheet 51 in the press forming process, into the panel surface portion 65a. On the other hand, the punch-side forming surface portion 3c and the die-side forming surface portion 5c form a portion 55b, which is on a side having high tension acting on the metal sheet 51 in the press forming process, into the panel surface portion 65b.

The groove 5d is formed in a concave shape in the die-side forming surface portion 5b, and the elastic body 9 is provided therein.

The blank holders 7 are arranged to face both ends of the die 5, and cooperate with the die 5 to sandwich the ends 51a and 51b of the metal sheet 51.

The elastic body 9 is provided in the groove 5d of the die-side forming surface portion 5b so that the elastic body 9 can contact a position away from a portion 53 corresponding to the character line 63 in the metal sheet 51, along the portion 53 and press the metal sheet 51, protrudes toward the punch 3 than the die-side forming surface portion 5b does, and is supported by a bottom of the groove 5d so as to be contractable in the press forming direction until a contact surface portion 9a in contact with the metal sheet 51 is flush with the die-side forming surface portion 5b.

The elastic body 9 has a hardness and a shape that can be deformed along a shape of a tool of press forming at the bottom dead center, and is preferably a rubber material or a urethane material having, for example, a Shore hardness of 40 to 100HS.

Then, as illustrated in the following equation (1), an amount of protrusion of the elastic body 9 from the die-side forming surface portion 5b is set so that a frictional force between the elastic body 9 and the metal sheet 51 given by a product of a load P pressing the metal sheet 51 by contraction of the elastic body 9 crushed in the press forming process and a friction coefficient μe of the elastic body 9 and the metal sheet 51 is equal to or greater than an absolute value of a difference between tensions F1 and F2 acting on both sides sandwiching the portion 53 corresponding to the character line 63.

$$|F1-F2| \leq P \times \mu e \qquad (1)$$

Here, the amount of protrusion of the elastic body 9 is assumed to be equal to an amount of contraction of the elastic body 9 in the press forming direction when the die 5 is moved relative to the punch 3 side up to the bottom dead center. Then, the load P that presses the metal sheet 51 by the contraction of the elastic body 9 is preferred to be calculated from the amount of contraction of the crushed elastic body 9.

Further, the friction coefficient μe of the elastic body 9 and the metal sheet 51 are measured in advance by a sliding test or the like. Alternatively, when the rubber material or the urethane material is used as the elastic body 9, the friction coefficient μe with the metal sheet 51 is generally μe=0.1 to 0.3 (lubricant), μe≈0.5 to 0.6 (dry), and thus these values may be used.

The difference between tensions acting on both sides sandwiching the portion 53 corresponding to the character line 63 in the press forming process is obtained in advance by an experiment using a strain gauge or the like to measure the tension acting on the metal sheet 51 when actually press forming the automotive outer panel 61 or the press forming analysis of the automotive outer panel 61 by the finite element method (FEM) or the like.

<Press Forming Method>

The press forming method for the automotive outer panel 61 according to the first embodiment will be described by taking as an example a case of using the press forming apparatus 1 where the automotive outer panel 61 in which the character line 63 illustrated in (a) of FIG. 2 is formed by using the press forming apparatus 1 including the punch 3, the die 5, the blank holders 7, and the elastic body 9 illustrated in FIG. 1.

As illustrated in FIG. 2, the press forming method for the automotive outer panel according to the first embodiment is a method in which the metal sheet 51 disposed between the punch 3 and the die 5 and having both ends 51a and 51b sandwiched between the die 5 and the blank holders 7 is press formed into the automotive outer panel 61 having the character line 63 and the panel surface portions 65a and 65b continuous on both sides from the character line 63, and includes an elastic body contact step of moving the die 5 relative to the punch 3 side, to bring the elastic body 9 into contact with the metal sheet 51 prior to the die 5, and a press forming step of further moving the die 5 relative to the punch 3 side up to the bottom dead center while crushing the elastic body 9 and pressing the metal sheet 51.

<<Elastic Body Contact Step>>

The elastic body contact step is a step in which the die 5 is moved relative to the punch 3 side while the ends 51a and 51b of the metal sheet 51 are respectively sandwiched between the die 5 and the blank holders 7, and the elastic body 9 is brought into contact with the metal sheet 51 prior to the die 5 before a portion of the metal sheet 51 in contact with the ridgeline 3a of the punch 3 is plastically deformed to generate the initial bending fold.

It can be determined that plastic deformation of the metal sheet 51 by the ridgeline 3a occurs, for example, when strain of the portion of the metal sheet 51 in contact with the ridgeline 3a exceeds a strain ε0 calculated by the following equation (2).

$$\varepsilon 0 = t/2R \qquad (2)$$

Here, R is a curvature radius of bending of the character line 63, and t is a plate thickness of the metal sheet 51.

<<Press Forming Step>>

The press forming step is a step of further moving the die 5 relative to the punch 3 side up to the bottom dead center while pressing the metal sheet 51 by the contact surface portion 9a of the elastic body 9 to contract the elastic body 9.

As illustrated in the above-mentioned equation (1), the amount of protrusion of the elastic body 9 provided on the die-side forming surface portion 5b is set so that the frictional force given by the product of the load P due to the contraction (deformation) in the press forming direction of the elastic body 9 crushed in the press forming step and the friction coefficient μe of the elastic body 9 and the metal sheet 51 is equal to or greater than the absolute value of the difference between tensions (F1 and F2 in FIG. 3) respectively acting on the ends 51a and 51b sandwiching the portion 53 corresponding to the character line 63 in the metal sheet 51.

Here, the load P by the elastic body 9, the friction coefficient μe of the elastic body 9 and the metal sheet 51, and the difference between tensions (F1-F2) acting on both sides sandwiching the portion 53 of the metal sheet 51 are given as described above.

<Reason why Skid Line is Prevented>

The reason why the automotive outer panel 61 can be press formed by preventing the skid line by the press forming method and the press forming apparatus 1 for the automotive outer panel 61 according to the first embodiment will be described below with reference to FIGS. 2 and 3.

First, the die 5 moves relative to the punch 3 side, and the elastic body 9 provided on the die-side forming surface portion Sb comes into contact with the portion 55a of the metal sheet 51 prior to the die 5 and presses the metal sheet 51 to press it against the punch-side forming surface portion 3b ((a) and (b) of FIG. 2). Subsequently, the portion of the metal sheet 51 in contact with the ridgeline 3a of the punch 3 is plastically deformed to generate the initial bending fold ((c) of FIG. 2).

Figure 3:
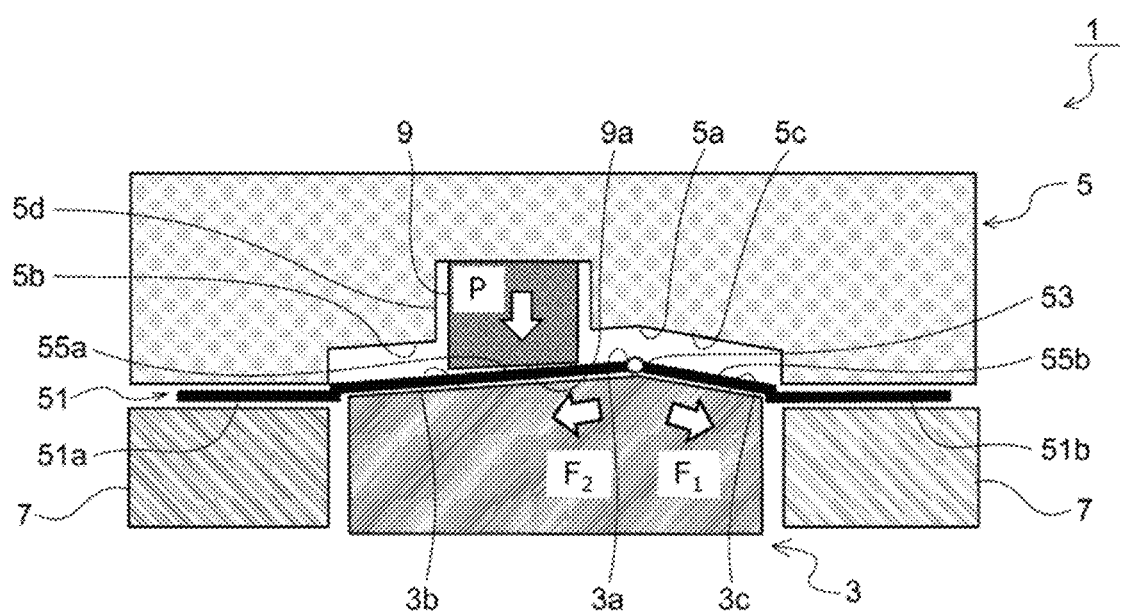
FIG. 3 is a diagram illustrating a load P pressing a metal sheet by a crushed elastic body and tensions F1 and F2 generated in the metal sheet in a press forming process, in the press forming method for the automotive outer panel according to the first embodiment of the present invention.

Subsequently, when the die 5 is further moved relative to the punch 3 side ((d) of FIG. 2), the tensions F1 and F2 are generated in the metal sheet 51 in the respective directions toward the ends 51a and 51b with the initial bending fold as the boundary (FIG. 3). Then, as in the conventional press forming method described above, there is a difference between the tension F1 on the end 51b side and the tension F2 on the end 51a side.

Due to this difference between the tensions, the metal sheet 51 may slide from the end 51a side having low tension to the end 51b side having high tension, and the initial bending fold may slide to the end 51b side having high tension. However, due to friction with the elastic body 9 contacting and pressing the portion 55b on the side having low tension in the metal sheet 51, it is possible to prevent the metal sheet 51 from sliding toward the end 51b having high tension, and to move the die 5 relative up to the bottom dead center without sliding the initial bending fold ((d) and (e) of FIG. 2). As a result, it is possible to press form the automotive outer panel 61 in which the skid line is prevented and the character line 63 is formed.

Note that in the first embodiment, a position where the metal sheet 51 is pressed by the elastic body 9 is set to a position away from the portion 53 corresponding to the character line 63. When the automotive outer panel 61 illustrated in FIG. 2 is press formed, the position away from the portion 53 corresponding to the character line 63 in the portion 55a corresponding to the panel surface portion 65a is brought into contact with the elastic body 9 along the portion 53.

A width of the groove 5d needs to be wider than that of the elastic body 9 in order to accommodate the deformation of the elastic body 9 being pressed. As described in Patent Literature 6, when the elastic body 9 is disposed in the vicinity of the portion 53 corresponding to the character line 63, since the vicinity is a position where a stress of forming the character line 63 is high, a corner of the widened groove 5d comes into contact with the vicinity of the portion 53 corresponding to the character line 63, and a linear flaw is likely to occur.

In the present invention, the groove 5d is located at the position away from the portion 53 corresponding to the character line 63, and is located in the die-side forming surface portion 5b which is relatively flat and has not nigh stress, and thus there is no problem of causing the above-mentioned linear flaw described in Patent Literature 6. Note that in the groove 5d for accommodating the elastic body 9, the corner of the groove 5d on the character line 63 side is preferably separated from the portion 53 corresponding to the character line 63 by 10% or more of length of the die-side forming surface portion 5b.

<Other Aspects>

In the above-mentioned press forming method and press forming apparatus 1, the elastic body 9 is brought into contact with the portion 55a on the side having low tension among the portions 55a and 55b on both sides sandwiching the portion 53 corresponding to the character line 63 in the metal sheet 51, and the automotive outer panel 61 having the character line 63 is press formed while the elastic body 9 was crushed to press the metal sheet 51.

Figure 4:
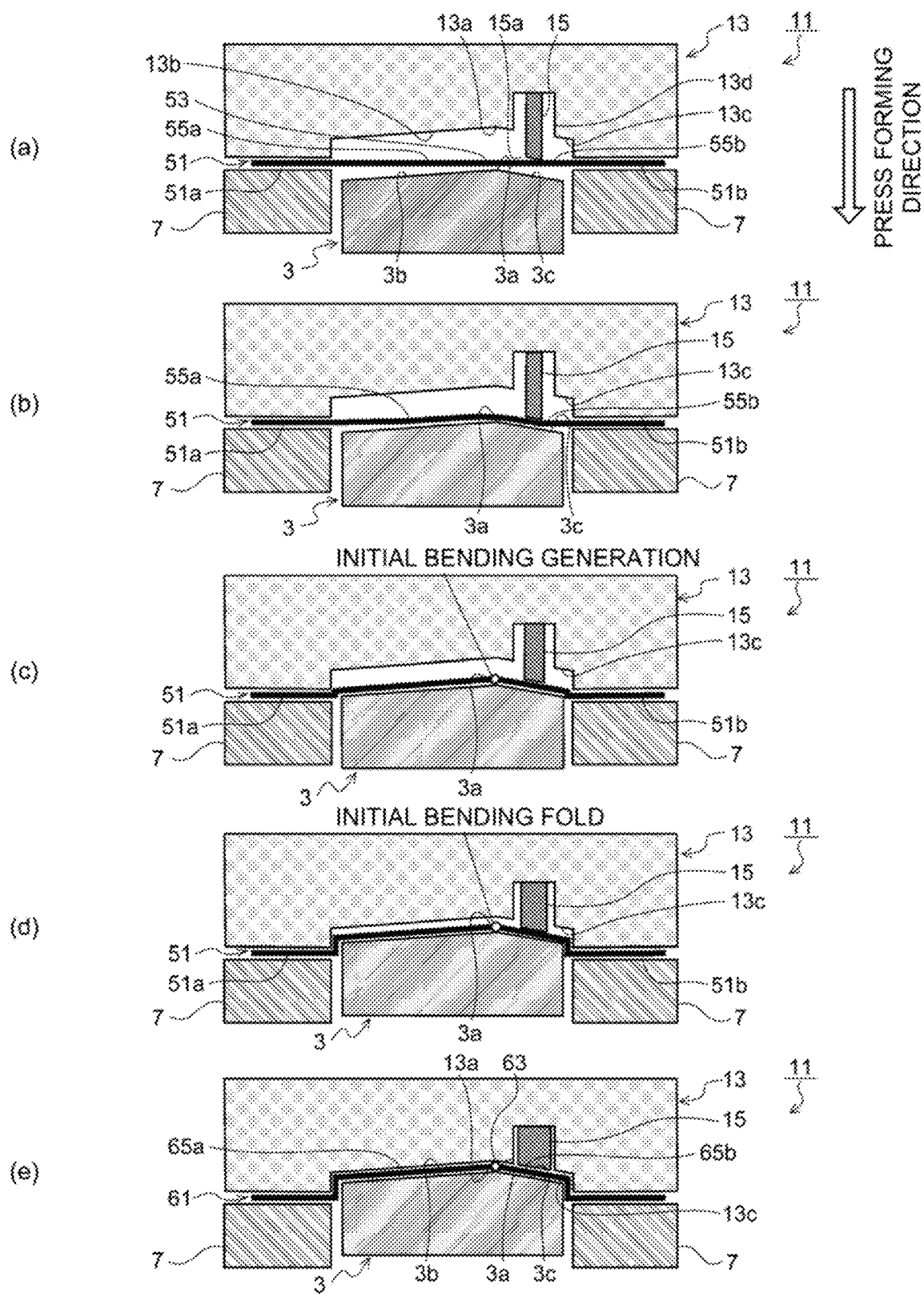
FIG. 4 is a diagram illustrating another aspect of the press forming apparatus and the press forming method for the automotive outer panel according to the first embodiment of the present invention.

However, as another aspect of the first embodiment of the present invention, as illustrated in FIG. 4, a press forming apparatus 11 may be employed in which an elastic body 15 is brought into contact with and presses the portion 55b on the side having high tension among the portions 55a and 55b on both sides sandwiching the portion 53 corresponding to the character line 63 in the metal sheet 51.

As illustrated in FIG. 4, the press forming apparatus 11 includes the punch 3, a die 13, the blank holders 7, and the elastic body 15. Since the punch 3 and the blank holders 7 are the same as those of the press forming apparatus 1 described above, the die 13 and the elastic body 15 will be described below.

The die 13 has a valley line 13a, die-side forming surface portions 13b and 13c continuous on both sides sandwiching the valley line 13a, and a groove 13d formed in a concave shape in the die-side forming surface portion 13c.

The valley line 13a cooperates with the ridgeline 3a of the punch 3 to form the character line 63 ((a) of FIG. 4). The die-side forming surface portion 13b forms the portion 55a on the side having low tension acting on the metal sheet 51 in the press forming process into the panel surface portion 65a. On the other hand, the die-side forming surface portion 13c forms the portion 55b on the side having high tension acting on the metal sheet 51 in the press forming process into the panel surface portion 65b.

The groove 13d is formed in a concave shape in the die-side forming surface portion 13c, and the elastic body 15 is provided therein.

The elastic body 15 is provided in the groove 13d formed in the die-side forming surface portion 13c so that the elastic body 15 can contact a position away from the portion 53 corresponding to the character line 63 in the metal sheet 51, along the portion 53 and press the metal sheet 51, protrudes toward the punch 3 than the die-side forming surface portion 13c does, and as supported by a bottom of the groove 13d so as to be contractable in the press forming direction until a contact surface portion 15a in contact with the metal sheet 51 is flush with the die-side forming surface portion 13c.

In the press forming of the automotive outer panel 61 using such a press forming apparatus 11, first, the die 13 is moved relative to the punch 3 side, and the elastic body 15 is brought into contact with the metal sheet 51 prior to the die 13 before the portion of the metal sheet 51 in contact with the ridgeline 3a of the punch 3 is plastically deformed to generate the initial bending fold ((a) and (b) of FIG. 4).

Subsequently, the contacted elastic body 15 is crushed, and the die 13 is further moved relative to the punch 3 side up to the bottom dead center while pressing the metal sheet 51, to press form the automotive outer panel 61 having the character line 63 ((c) to (e) of FIG. 4).

Here, as illustrated in the above-mentioned equation (1), an amount of protrusion of the elastic body 15 is set so that the frictional force between the elastic body 15 protruding toward the punch 3 than the die-side forming surface portion 13c does and the metal sheet 51 is equal to or greater than the absolute value of the difference between the tensions F1 and F2 respectively acting on the ends 51a and 51b sandwiching the portion 53 corresponding to the character line 63.

In this way, even by press forming the metal sheet 51 while the elastic body 15 is brought into contact with and presses the portion 55b on the side having high tension, the metal sheet 51 does not slide to the end 51b side having high tension, and it is possible to move the die 13 relative up to the bottom dead center without sliding the initial bending fold ((c) no (e) of FIG. 4). From the above, it is possible to press form the automotive outer panel 61 in which the skid line is prevented and the character line 63 is formed.

Second Embodiment

In explaining the press forming method and a press forming apparatus 21 of the automotive outer panel 61 according to the second embodiment of the present invention, first, the press forming apparatus 21 according to the second embodiment will be described.

<Press Forming Apparatus>

Figure 5:
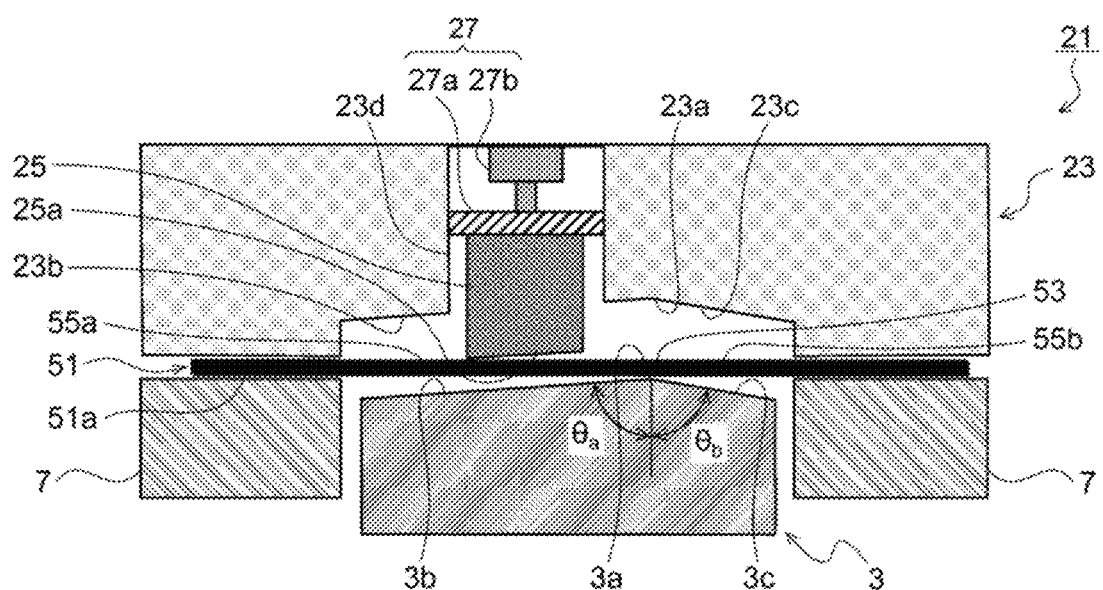
FIG. 5 is a diagram illustrating a press forming apparatus for an automotive outer panel according to a second embodiment of the present invention.
Figure 6:
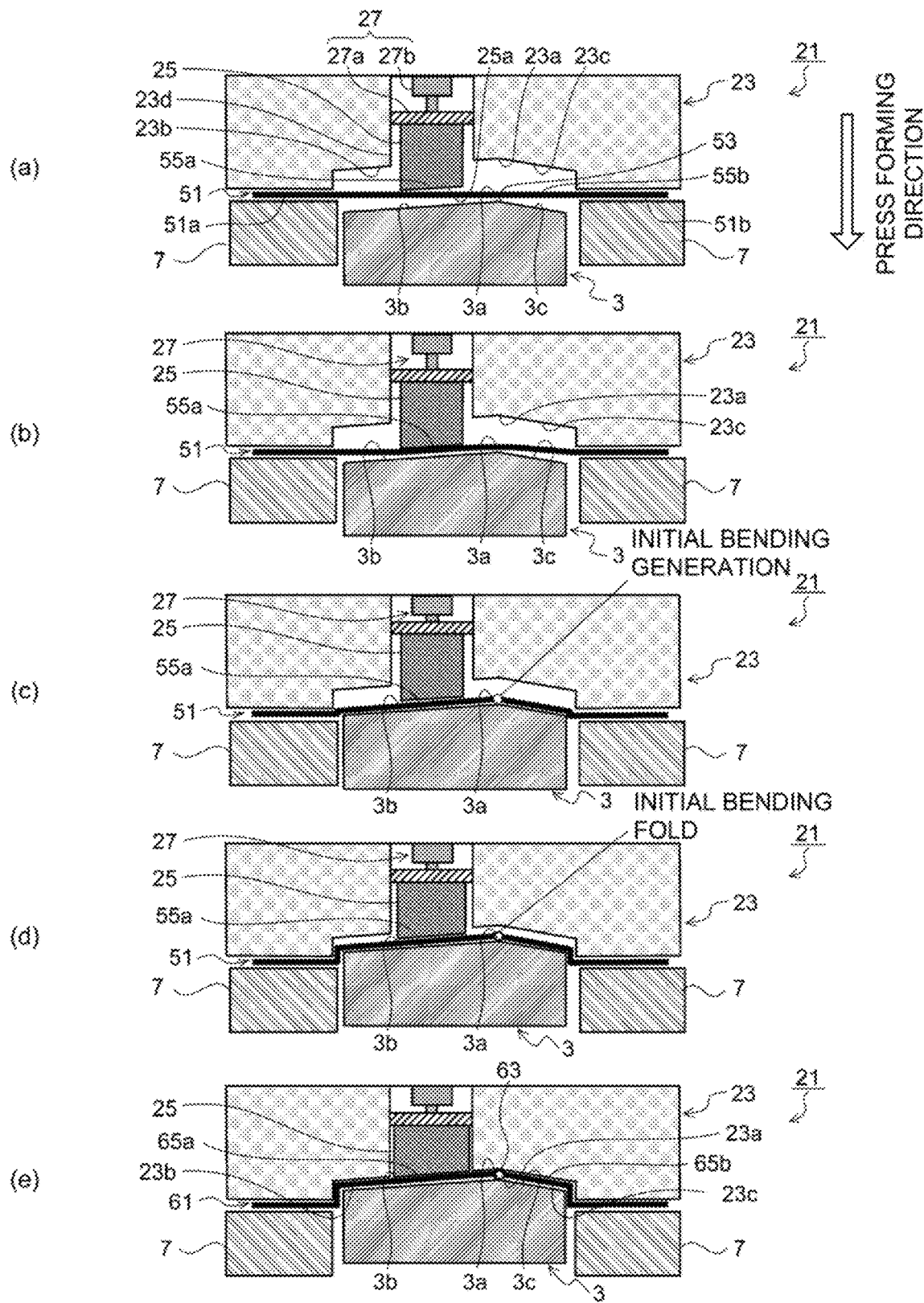
FIG. 6 is a diagram illustrating a press forming method for the automotive outer panel according to the second embodiment of the present invention.

The press forming apparatus 21 for the automotive outer panel 61 according to the second embodiment (hereinafter, simply referred to as the "press forming apparatus 21") is an apparatus for press forming the metal sheet 51 on the automotive outer panel 61 having the character line 63 and the panel surface portions 65a and 65b continuous on both sides of the character line 63, and as illustrated in FIGS. 5 and 6, includes the punch 3, a die 23, the blank holders 7, an elastic body 25, and a movable device 27.

Since the punch 3 and the blank holders 7 are the same as those of the press forming apparatus 1 according to the first embodiment described above, the die 23, the elastic body 25, and the movable device 27 will be described below.

Similar to the die 5 of the press forming apparatus 1 according to the first embodiment described above, the die 23 has a valley line 23a, die-side forming surface portions 23b and 23c continuous on both sides sandwiching the valley line 23a, and a groove 23d formed in a concave shape in the die-side forming surface portion 23b.

The valley line 23a cooperates with the ridgeline 3a of the punch 3 to form the character line 63 ((e) of FIG. 6). The die-side forming surface portions 23b and 23c respectively cooperate with the punch-side forming surface portions 3b and 3c to form the panel surface portions 65a and 65b ((e) of FIG. 6).

The die-side forming surface portion 23b forms the portion 55a on the side having low tension acting on the metal sheet 51 in the press forming process into the panel surface portion 65a. On the other hand, the die-side forming surface portion 23c forms the portion 55b on the side having high tension acting on the metal sheet 51 in the press forming process into the panel surface portion 65b.

The groove 23d is formed in a concave shape in the die-side forming surface portion 23b, and is provided with the elastic body 25 and the movable device 27.

The elastic body 25 is provided in the groove 23d of the die-side forming surface portion 23b so that the elastic body 25 can contact a position away from the Portion 53 corresponding to the character line 63 in the metal sheet 51, along the portion 53 and press the metal sheet 51, protrudes toward the punch 3 than the die-side forming surface portion 23b does, and is provided in the groove 23d so as to be contractable in the press forming direction until a contact surface portion 25a in contact with the metal sheet 51 is flush with the die-side forming surface portion 23b.

The elastic body 25 has the hardness and the shape that can be deformed along the shape of the tool of press forming at the bottom dead center, and is preferably the rubber material or the urethane material having, for example, a Shore hardness of 40 to 100HS.

Further, the elastic body 25 is supported by the bottom of the groove 23d via the movable device 27 capable of pressing the elastic body 25 toward the punch 3 to press the metal sheet 51.

The movable device 27 presses the elastic body 25 toward the punch 3 so that the elastic body 25 protrudes toward the punch 3 than the die-side forming surface portion 23b does, and in the press forming process, the contact surface portion 25a of the elastic body 25 brought into contact with the metal sheet 51 and crushed is made flush with the die-side forming surface portion 23b and the elastic body 25 contracts, and includes a pad 27a to which the elastic body 25 is attached and a pressure source 27b for applying pressure to the pad 27a. Here, examples of the pressure source 27b include air pressure and oil pressure.

In the press forming apparatus 21 according to the second embodiment, the amount of protrusion of the elastic body 25 is set so that the frictional force between the elastic body 25 and the metal sheet 51, which is given by the product of the load P pressing the metal sheet 51 by the elastic body 25 crushed in the press forming process and the movable device 27 and the friction coefficient μe of the elastic body 25 and the metal sheet 51, is equal to or greater than the absolute value of the difference between tensions F1 and F2 acting on both sides sandwiching the portion corresponding to the character line 63 (see the above equation (1)).

Here, the load pressing the metal sheet 51 by the elastic body 25 is a load due to the contraction of the crushed elastic body 25, and the movable device 27 presses the elastic body 25 with a pressure acting on the pad 27a by the pressure source 27b.

Further, the value of the friction coefficient μe of the elastic body 25 and the metal sheet 51 is given as in the first embodiment described above.

Further, the difference between the tensions acting on the metal sheet 51 in the press forming process using the press forming apparatus 21 according to the second embodiment is obtained in advance by the experiment using the strain gauge or the like to measure the tension acting on the metal sheet 51 when actually press forming the automotive outer panel 61 or the press forming analysis of the automotive outer panel 61 by the finite element method (FEM) or the like.

<Press Forming Method>

The press forming method for the automotive outer panel 61 according to the second embodiment will be described by taking as an example a case where the automotive outer panel 61 in which the character line 63 illustrated in (e) of FIG. 6 is formed is press formed by using the press forming apparatus 21 including the punch 3, the die 23, the blank holders 7, the elastic body 25, and the movable device 27 illustrated in FIG. 5.

As illustrated in FIG. 6, the press forming method for the automotive outer panel 61 according to the second embodiment is a method in which the metal sheet 51 disposed between the punch 3 and the die 23 and having both ends 51a and 51b sandwiched between one die 23 and the blank holders 7 is press formed into the automotive outer panel 61 having the character line 63 and the panel surface portions 65a and 65b continuous on both sides from the character line 63, and includes an elastic body contact step of moving the die 23 relative to the punch 3 side, to bring the elastic body 25 into contact with the metal sheet 51 prior to the die 23, and a press forming step of further moving the die 23 relative to the punch 3 side up to the bottom dead center while crushing the elastic body 25 and pressing the metal sheet 51.

<<Elastic Body Contact Step>>

The elastic body contact step is a step in which the die 23 is moved relative to the punch 3 side while the ends 51a and 51b of the metal sheet 51 are respectively sandwiched between the die 23 and the blank holders 7, and the elastic body 25 is brought into contact with the metal sheet 51 prior to the die 23 before the portion of the metal sheet 51 in contact with the ridgeline 3a of the punch 3 is plastically deformed to generate the initial bending fold.

It is determined that plastic deformation of the metal sheet 51 by the ridgeline 3a occurs, for example, when the strain of the portion of the metal sheet 51 in contact with the ridgeline 3a exceeds the strain ε0 calculated by the above equation (2).

<<Press Forming Step>>

The press forming step is a step of further moving the die 23 relative to the punch 3 side up to the bottom dead center while crushing the elastic body 25 until the elastic body 25 is flush with the die-side forming surface portion 23b and pressing the metal sheet 51.

In the press forming method according to the second embodiment, as illustrated in the above-mentioned equation (1), in the elastic body 25 provided on the die-side forming surface portion 23b, the amount of protrusion from the die-side forming surface portion 23b and a pressure of the pressure source 27b acting on the pad 27a are adjusted so that the frictional force given by the product of the load P (P in FIG. 1) pressing the metal sheet 51 by the elastic body 25 supported via the movable device 27 in the press forming step and the friction coefficient μe of the elastic body 25 and the metal sheet 51 is equal to or greater than the absolute value of the difference between tensions F1 and F2 respectively acting on the ends 51a and 51b sandwiching the portion 53 corresponding to the character line 63 in the metal sheet 51.

Here, the friction coefficient μe of the elastic body 25 and the metal sheet 51, and the difference between tensions (F1-F2) acting on both sides sandwiching the portion 53 of the metal sheet 51 are given as described above.

<Operational Effects>

Operational effects of the press forming method and the press forming apparatus 21 according to the second embodiment are as follows. As illustrated in FIG. 6, when the metal sheet 51 is press formed while the elastic body 25 supported by the groove 23d of the die-side forming surface portion 23b via the movable device 27 is brought into contact with and presses the metal sheet 51, it is possible to apply a load due to the contraction of the elastic body 25 crushed by a load acting on the pad 27a by the pressure source 27b to the metal sheet 51.

Then, the load pressing the metal sheet 51 by the elastic body 25 can be adjusted by the amount of protrusion of the elastic body 25 from the die-side forming surface portion 23b and the load acting on the pad 27a by the pressure source 27b. Here, the amount of protrusion of the elastic body 25 is assumed to be equal to the amount of contraction in the press forming direction of the elastic body 25 when the die 23 is moved relative to the punch 3 side up to the bottom dead center.

For example, even when sufficient frictional force cannot be obtained with the metal sheet 51, or the difference between tensions (F1-F2) in the metal sheet 51 is large before the load pressing the metal sheet 51 is sufficiently large due to the contraction of the elastic body 25, by further applying a load to the pad 27a to which the elastic body 25 is attached by the pressure source 27b, the degree of freedom for adjusting the load of the elastic body 25 pressing the metal sheet 51 is increased.

This is preferable because it is possible to press form the automotive outer panel 61 in which the skid line is more effectively prevented and the character line 63 is formed.

<Other Aspects>

In the above-mentioned press forming method and press forming apparatus 21 for the automotive outer panel 61, the automotive outer panel 61 having the character line 63 is press formed while the elastic body 25 supported by the movable device 27 is brought into contact with and presses the portion 55a on the side having low tension in the metal sheet 51.

Figure 7:
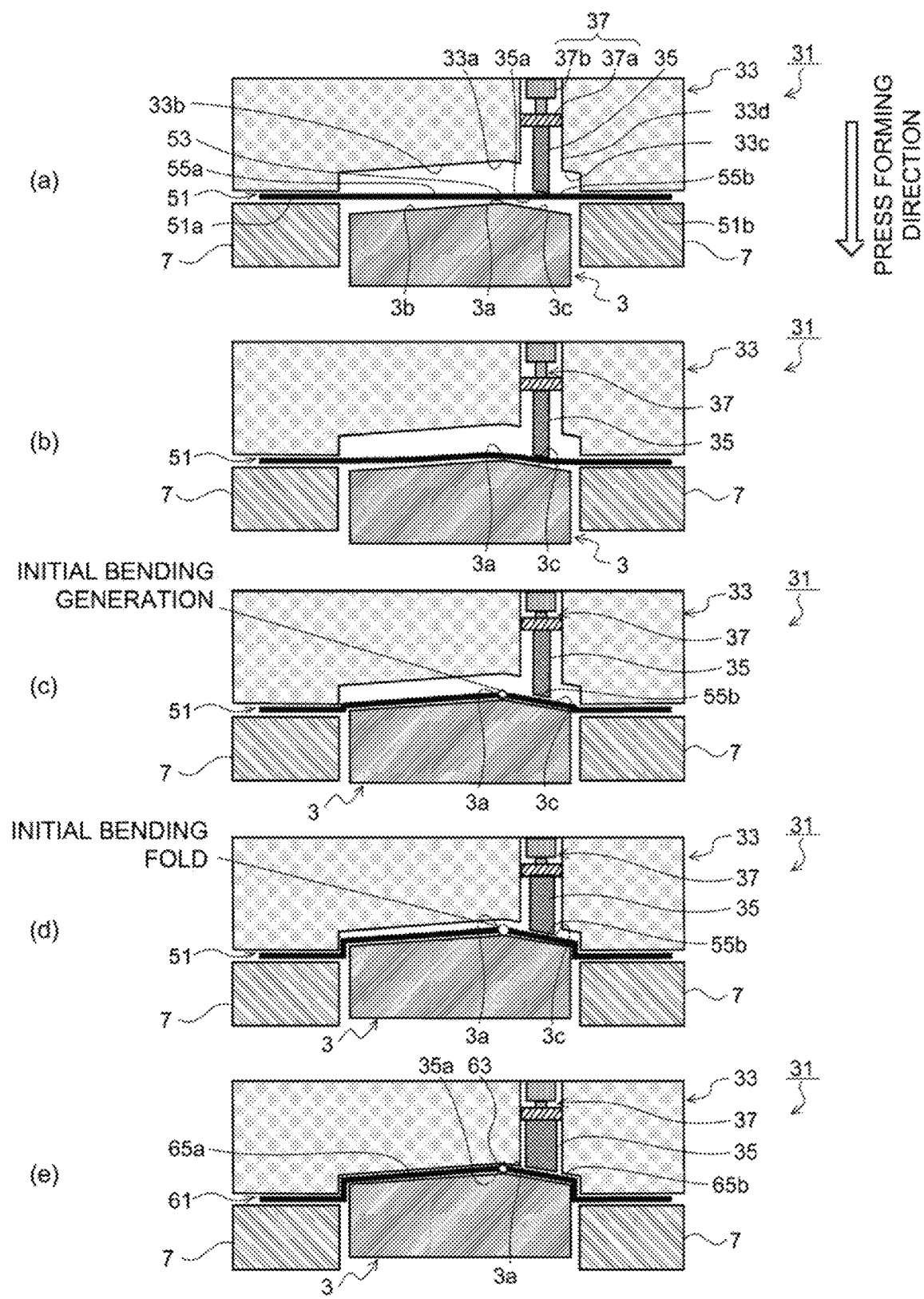
FIG. 7 is a diagram illustrating another aspect of the press forming apparatus and the press forming method for the automotive outer panel according to the second embodiment of the present invention.

However, as another aspect of the second embodiment of the present invention, as illustrated in FIG. 7, a press forming, apparatus 31 may be employed in which an elastic body 35 supported by a movable device 37 is brought into contact with and presses the portion 55b on the side having high tension in the metal sheet 51.

As illustrated in FIG. 7, the press forming apparatus 31 includes the punch 3, a die 33, the blank holders 7, the elastic body 35, and the movable device 37. Since the punch 3 and the blank holders 7 are the same as those of the press forming apparatus 1 described above, the die 33, the elastic body 35, and the movable device 37 will be described below.

The die 33 has a valley line 33a, die-side forming surface portions 33b and 33c continuous on both sides sandwiching the valley line 33a, and a groove 33d formed in a concave shape in the die-side forming surface portion 33c.

The valley line 33a cooperates with the ridgeline 3a of the punch 3 to form the character line 63 ((e) of FIG. 7). The die-side forming surface portion 33b forms the portion 55a on the side having low tension acting on the metal sheet 51 in the press forming process into the panel surface portion 65a. On the other hand, the die-side forming surface portion 33c forms the portion 55b on the side having high tension acting on the metal sheet 51 in the press forming process into the panel surface portion 65b.

The groove 33d is formed in a concave shape in the die-side forming surface portion 33c, and the elastic body 35 and the movable device 37 are provided therein.

The elastic body 35 is provided in the groove 33d of the die-side forming surface portion 33c so that the elastic body 35 can contact a position away from the portion 53 corresponding to the character line 63 in the metal sheet 51, along the portion 53 and press the metal sheet 51, protrudes toward the punch 3 than the die-side forming surface portion 33c does, and is provided in the groove 33d so as to be contractable in the press forming direction until a contact surface portion 35a in contact with the metal sheet 51 is flush with the die-side forming surface portion 33c.

The elastic body 35 has the hardness and the shape that can be deformed along the shape of the tool of press forming at the bottom dead center, and is preferably the rubber material or the urethane material having, for example, a Shore hardness of 40 to 100HS.

Further, the elastic body 35 is supported by the bottom of the groove 33d via the movable device 37 capable of pressing the elastic body 35 toward the punch 3 to press the metal sheet 51.

The movable device 37 presses the elastic body 35 toward the punch 3 so that the elastic body 35 protrudes toward the punch 3 from the die-side forming surface Portion 33c, and in the press forming process, the contact surface portion 35a of the elastic body 35 brought into contact with the metal sheet 51 and crushed is made flush with the die-side forming surface portion 33c and the elastic body 35 contracts, and includes a pad 37a to which the elastic body 35 is attached and a pressure source 37b for applying pressure to the pad 37a. Here, examples of the pressure source 37b include air pressure and oil pressure.

In the press forming of the automotive outer panel 61 using such a press forming apparatus 31, first, the die 33 is moved relative to the punch 3 side, and the elastic body 35 is brought into contact with the metal sheet 51 prior to the die 33 before the portion of the metal sheet 51 in contact with the ridgeline 3a of the punch 3 is plastically deformed to generate the initial bending fold ((a) and (b) of FIG. 7).

Subsequently, the die 33 is further moved relative to the punch 3 side up to the bottom dead center while crushing the elastic body 35 and pressing the metal sheet 51, to press form the automotive outer panel 61 in which the character line 63 is formed ((c) to (e) of FIG. 7).

When the metal sheet 51 is press formed while the elastic body 35 supported by the groove 33d of the die-side forming surface portion 33c via the movable device 37 as brought into contact with and presses the metal sheet 51, it is possible to apply a load due to the contraction of the elastic body 35 crushed by a load acting on the pad 37a by the pressure source 37b to the metal sheet 51.

In this way, even when the metal sheet 51 is press formed while the elastic body 35 is brought into contact with and presses the portion 55b on the side having high tension, the metal sheet 51 does not slide to the end 51b side having high tension, and it is possible to move the die 33 relative up to the bottom dead center without sliding the initial bending fold ((c) to (e) of FIG. 7). Thus, it is possible to press form the automotive outer panel 61 in which the skid line is prevented and the character line 63 is formed.

Note that the load pressing the metal sheet 51 by the elastic body 35 can be adjusted by the amount of protrusion of the elastic body 35 from the die-side forming surface portion 33c and the load acting an the pad 37a by the pressure source 37b.

Therefore, for example, even when sufficient frictional force cannot be obtained with the metal sheet 51, or the difference between tensions (F1-F2) in the metal sheet 51 is large before the load pressing the metal sheet 51 is sufficiently large due to the contraction of the elastic body 35, the degree of freedom for adjusting the load of the elastic body 35 pressing the metal sheet 51 is increased.

This is preferable because it is possible to press form the automotive outer panel 61 in which the skid line is more effectively prevented and the character line 63 is formed.

Example

An example was carried out to verify an effect of preventing the skid line when the automotive outer panel is press formed and the character line is formed by the press forming method and the press forming apparatus for the automotive outer panel according to the present invention, and thus this will be described below.

In the present embodiment, the press forming analysis was performed in which an outer panel model simulating the automotive outer panel having the character line was press formed by the press forming method according to the present invention, and the presence or absence of the skid line in the press formed outer panel model was evaluated.

In the press forming analysis, a 0.7 mm thick steel plate SGCC-F was used a t metal sheet, and the outer panel model (not illustrated) having the character line and the panel surface portions continuous on both sides of the character line was analyzed.

Here, the curvature radius R of the character line was 3 mm, and the width of the panel surface portions was 50 mm. The angles of the panel surface with respect to the press forming direction were θa=85° and θb=65°.

In the present embodiment, as a conventional example, the press forming analysis of a process of deep drawing the metal sheet into the outer panel by a press forming apparatus including the punch, the die, and the blank holders (see FIG. 8) was performed.

Then, in the press forming process, the tension on the panel surface portion side having a small angle (θb=65°) is larger than that on the other panel surface portion side, and the obtained difference between tensions acting on both sides of the portion corresponding to the character line was to be 202 kN.

Next, as an example of the invention, the press forming apparatus including the punch, the die, the blank holders, and the elastic body was used, and the press forming analysis was performed in the process of deep drawing the metal sheet (see FIG. 2) while the elastic body is brought into contact with and presses the position away from the portion corresponding to the character line in the metal sheet (position in which a corner on the character line side of the groove is at 10% of the length of die-side forming surface portion).

The elastic body was provided in the groove of the die-side forming surface portion so as to project 12 mm from the die-side forming surface portion to the punch side so that the elastic body can contact the position away from the portion corresponding to the character line in the metal sheet, along the portion and can press, the metal sheet.

Here, the amount of protrusion of the elastic body from the die-side forming surface portion was set on the basis of the difference between tensions (=202 kN) acting on both sides sandwiching the portion corresponding to the character line in the press forming process according to the conventional example. Note that in the press analysis, the material of the elastic body was rigid urethane, the friction coefficient of the elastic body and the metal sheet was 0.6, and an elastic modulus of the elastic body was 253 N/mm².

Figure 9:
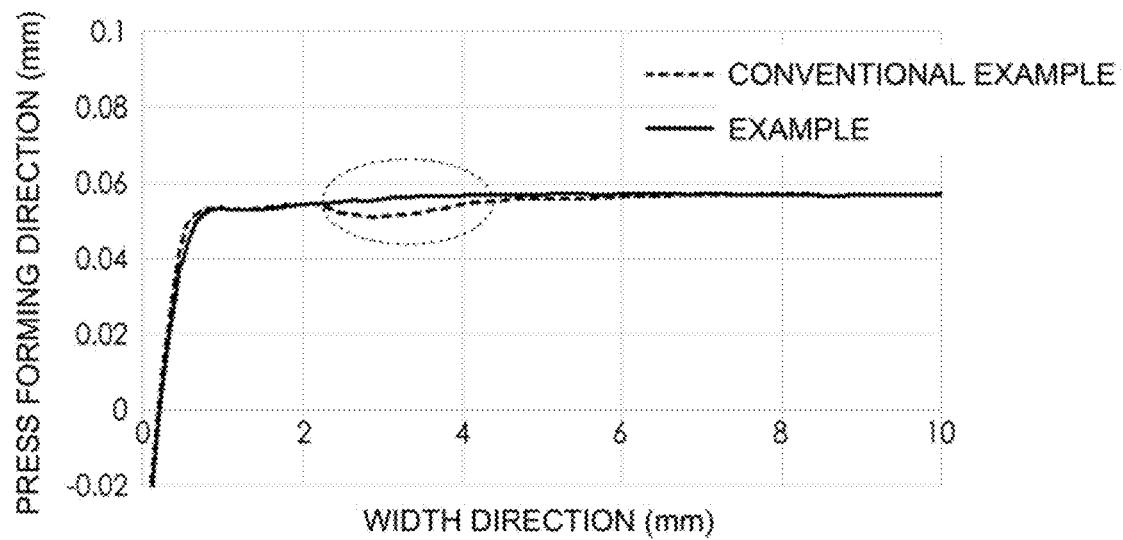
FIG. 9 is a diagram illustrating a result of a cross-sectional shape of the outer panel obtained by press forming analysis in an example.
Figure 9:
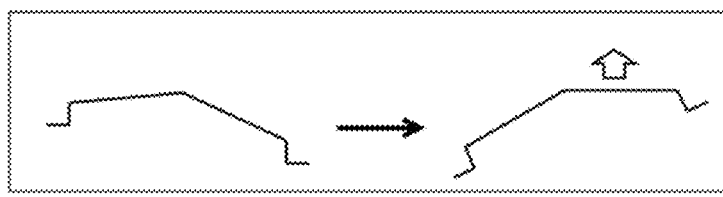

FIG. 9 illustrates a result of a cross-sectional shape of the outer panel obtained by the press forming analysis. Here, FIG. 9 illustrates a state of enlarging a portion of the press formed outer panel centered on the character line, and rotating the result of the cross-sectional shape so that the panel surface portion on the side having a small angle with respect to the press forming direction is substantially horizontal.

From FIG. 9, as compared with the example, in the conventional example, a concave shape (a portion surrounded by a dotted ellipse in FIG. 9) due to the skid line was observed on the panel surface portion on the side having high tension.

Figure 10:
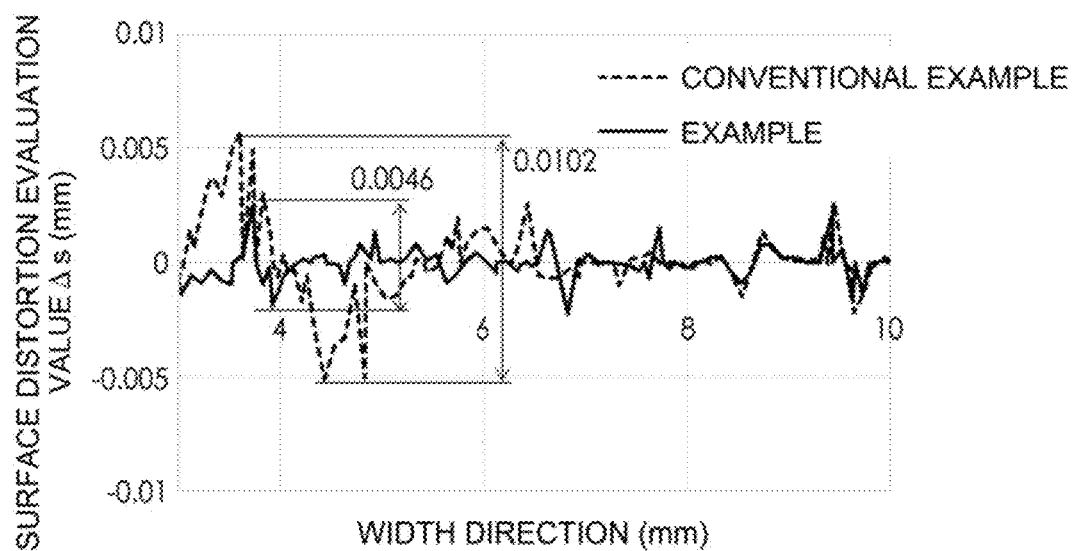
FIG. 10 is a diagram illustrating a result of an evaluation value is of surface distortion of the outer panel obtained by the press forming analysis in the example.

FIG. 10 illustrates a result of evaluation of surface distortion of the outer panel obtained by the press forming analysis. An evaluation value Δs of the surface distortion illustrated in FIG. 10 is expressed by the maximum-minimum difference in mountain height by a three-point gauge (fixed span L) as described in the following known reference. (Reference Literature). The Japan Sheet Metal Forming Research Group, Press Forming Difficulty Handbook 4th Edition, "Chapter 5 Poor Surface Shape Accuracy and Evaluation for Forming Difficulty", pp. 218-221, Nikkan Kogyo Shimbun, Ltd. (2017).

From FIG. 10, the difference between the maximum value and the minimum value of the evaluation value Δs of the surface distortion was 0.0102 in the conventional example, whereas it was 0.0046 in the example. Thus, it can be understood that the surface distortion in the panel surface portion was reduced by press forming while pressing by the elastic body.

As described above, according to the present invention, it has been illustrated that it is possible to press form the automotive outer panel in which the skid line is prevented and the character line is formed.

INDUSTRIAL APPLICABILITY

According to the present invention, it is possible to provide a press forming method and a press forming apparatus for an automotive outer panel, in which a skid line is prevented without increasing man-hours for press forming and a target character line is formed.

REFERENCE SIGNS LIST

1 PRESS FORMING APPARATUS
3 PUNCH
3a RIDGELINE
3b, 3c PUNCH-SIDE FORMING SURFACE PORTION
5 DIE
5a VALLEY LINE
5b, 5c DIE-SIDE FORMING SURFACE PORTION
5d GROOVE
7 BLANK HOLDER
9 ELASTIC BODY
11 PRESS FORMING APPARATUS
13 DIE
13a VALLEY LINE
13b, 13c DIE-SIDE FORMING SURFACE PORTION
13d GROOVE
15 ELASTIC BODY
21 PRESS FORMING APPARATUS
23 DIE
23a VALLEY LINE
23b, 23c DIE-SIDE FORMING SURFACE PORTION
23d GROOVE
25 ELASTIC BODY
27 MOVABLE DEVILS
27a PAD
27b PRESSURE SOURCE
31 PRESS FORMING APPARATUS
33 DIE
33a VALLEY LINE
33b, 33c DIE-SIDE FORMING SURFACE PORTION
33d GROOVE
35 ELASTIC BODY
37 MOVABLE DEVICE
37a PAD
37b PRESSURE SOURCE
41 PRESS FORMING APPARATUS
43 PUNCH
43a RIDGELINE
45 DIE
45a VALLEY LINE
47 BLANK HOLDER
51 METAL SHEET
53 PORTION CORRESPONDING TO CHARACTER LINE
55a, 55b PORTION CORRESPONDING TO PANEL SURFACE PORTION
61 AUTOMOTIVE OUTER PANEL
63 CHARACTER LINE
65a, 65b PANEL SURFACE PORTION

The invention claimed is:

1. A press forming method for press forming a metal sheet into an automotive outer panel having a character line and panel surface portions continuous on both sides of the character line, each of the panel surface portions on both sides of the character line differing in (i) an angle with respect to a press forming direction or (ii) forming depths at both ends of the metal sheet,
the method using:
a punch comprising:
a ridgeline, and
punch-side forming surface portions located on both sides sandwiching the ridgeline,
a die facing the punch and comprising:
a valley line that cooperates with the ridgeline of the punch to form the character line,
die-side forming surface portions that are continuous on both sides sandwiching the valley line and that cooperate with the punch-side forming surface portions to form the panel surface portions,
wherein one of the die-side forming surface portions includes an elastic body that:
protrudes toward the punch than the die-side forming surface portion so that the elastic body is able to contact and press a position away from a portion corresponding to the character line in the metal sheet, along the portion corresponding to the character line, and
is supported to be contractable until a contact surface portion in contact with the metal sheet is flush with the die-side forming surface portion, and
a blank holder facing an end of the die,
the method comprising:
moving the die relative to the punch side while both ends of the metal sheet are sandwiched between the die and the blank holder, to bring the contact surface portion of the elastic body into contact with the metal sheet before a portion of the metal sheet in contact with the punch is plastically deformed; and
further moving the die relative to the punch side up to a bottom dead center while pressing the metal sheet by the contact surface portion of the elastic body to contract the elastic body,
wherein:
the elastic body has a hardness and a shape that can be deformed along the punch-side forming surface portion at the bottom dead center, and
an amount of protrusion of the elastic body from the die-side forming surface portion is set so that a frictional force given by a product of a load of the elastic body pressing the metal sheet in the further moving the die relative to the punch side up to the bottom dead center and a friction coefficient of the elastic body and the metal sheet, is equal to or greater than an absolute value of a difference between tensions acting on both sides sandwiching the portion corresponding to the character line.

2. The press forming method according to claim 1, wherein the elastic body is supported on the die side via a movable device configured to press the elastic body toward the punch and pressing the metal sheet.

3. The press forming method according to claim 2, wherein the elastic body presses a portion on a side having low tension and having a larger angle with respect to the press forming direction or a smaller forming depth, among portions on both sides sandwiching the portion corresponding to the character line.

4. The press forming method according to claim 2, wherein the elastic body presses a portion on a side having high tension and having a smaller angle with respect to the press forming direction or a larger forming depth, among portions on both sides sandwiching the portion corresponding to the character line.

5. The press forming method according to claim 1, wherein the elastic body presses a portion on a side having low tension and having a larger angle with respect to the press forming direction or a smaller forming depth, among portions on both sides sandwiching the portion corresponding to the character line.

6. The press forming method according to claim 1, wherein the elastic body presses a portion on a side having high tension and having a smaller angle with respect to the press forming direction or a larger forming depth, among portions on both sides sandwiching the portion corresponding to the character line.

7. A press forming apparatus for press forming a metal sheet into an automotive outer panel having a character line and panel surface portions continuous on both sides of the character line, each of the panel surface portions on both sides of the character line differing in (i) an angle with respect to a press forming direction or (ii) forming depths at both ends of the metal sheet, the press forming apparatus comprising:
    a punch comprising:
        a ridgeline, and
        punch-side forming surface portions located on both sides sandwiching the ridgeline;
    a die facing the punch and comprising:
        a valley line configured to cooperate with the ridgeline of the punch to form the character line,
        die-side forming surface portions configured to cooperate with the punch-side forming surface portions respectively to form the panel surface portions on both sides of the character line, wherein
    one of the die-side forming surface portions includes an elastic body that:
        protrudes toward the punch than the die-side forming surface portion so that the elastic body is able to contact and press a position away from a portion corresponding to the character line in the metal sheet, along the portion corresponding to the character line, and
        is supported to be contractable until a contact surface portion in contact with the metal sheet is flush with the die-side forming surface portion; and
    a blank holder facing an end of the die,
    wherein:
    the elastic body has a hardness and a shape that can be deformed along the punch-side forming surface portion at the bottom dead center, and
    an amount of protrusion of the elastic body from the die-side forming surface portion is set so that a frictional force given by a product of a load of the elastic body pressing the metal sheet in the press forming process and a friction coefficient of the elastic body and the metal sheet, is equal to or greater than an absolute value of a difference between tensions acting on both sides sandwiching the portion corresponding to the character line.

8. The press forming apparatus according to claim 7, wherein the elastic body is supported on the die side via a movable device configured to press the elastic body toward the punch and press the metal sheet.

9. The press forming apparatus according to claim 8, wherein the elastic body is provided on the die so as to press a portion on a side having low tension and having a larger angle with respect to the press forming direction or a smaller forming depth, among portions on both sides sandwiching the portion corresponding to the character line.

10. The press forming apparatus according to claim 8, wherein the elastic body is provided on the die so as to press a portion on a side having high tension and having a smaller angle with respect to the press forming direction or a larger forming depth, among portions on both sides sandwiching the portion corresponding to the character line.

11. The press forming apparatus according to claim 7, wherein the elastic body is provided on the die so as to press a portion on a side having low tension and having a larger angle with respect to the press forming direction or a smaller forming depth, among portions on both sides sandwiching the portion corresponding to the character line.

12. The press forming apparatus according to claim 7, wherein the elastic body is provided on the die so as to press a portion on a side having high tension and having a smaller angle with respect to the press forming direction or a larger forming depth, among portions on both sides sandwiching the portion corresponding to the character line.

\* \* \* \* \*